United States Patent [19]
Knudson

[11] Patent Number: 5,715,578
[45] Date of Patent: Feb. 10, 1998

[54] BUNDLE TIE

[76] Inventor: Albin Eugene Knudson, 6433 W. Brooks Ave., Las Vegas, Nev. 89108

[21] Appl. No.: 818,258

[22] Filed: Mar. 14, 1997

Related U.S. Application Data

[60] Provisional application No. 60/013,379, Mar. 14, 1996.

[51] Int. Cl.⁶ .................. B65D 63/00; F16L 33/00
[52] U.S. Cl. .............. 24/16 PB; 24/17 B; 24/301; 24/17 AP; 24/115 L; 24/265 EC
[58] Field of Search .............. 24/16 PB, 16 R, 24/17 B, 17 AP, 300–302, 129.13, 30.5 R, 30.5 P, 114.5, 243 R, 115 L, 265 C, 265 K, 265 AL, 265 EC

[56] References Cited

U.S. PATENT DOCUMENTS

| | | | |
|---|---|---|---|
| 219,434 | 9/1879 | Barron | 24/114.5 |
| 410,978 | 9/1889 | Kimball . | |
| 2,326,693 | 8/1943 | Sindler | 24/17 B X |
| 2,699,585 | 1/1955 | Patterson | 24/16 PB X |
| 2,969,070 | 1/1961 | Todfield | 24/17 AP X |
| 3,048,906 | 8/1962 | Patterson | 24/16 PB X |
| 3,081,781 | 3/1963 | Stermer | 24/17 AP X |
| 3,099,271 | 7/1963 | Dubelier . | |
| 3,919,740 | 11/1975 | Scherb | 24/301 X |
| 4,158,250 | 6/1979 | Ringwald . | |
| 4,335,490 | 6/1982 | Teachout . | |
| 4,428,099 | 1/1984 | Richmond | 24/265 R X |
| 4,569,108 | 2/1986 | Schwab . | |
| 4,762,318 | 8/1988 | Phillips et al. | 24/115 L |
| 4,910,835 | 3/1990 | Carpenter . | |
| 4,991,265 | 2/1991 | Campbell et al. . | |
| 5,081,746 | 1/1992 | Czwartacki . | |
| 5,199,135 | 4/1993 | Gold . | |
| 5,325,568 | 7/1994 | Bruhm | 24/265 R |
| 5,592,718 | 1/1997 | Mohr | 24/265 R X |

FOREIGN PATENT DOCUMENTS 13946   7/1899   United Kingdom .

*Primary Examiner*—Peter M. Cuomo
*Assistant Examiner*—Robert J. Sandy
*Attorney, Agent, or Firm*—Rick Martin

[57] ABSTRACT

A plastic handle about two inches long has a longitudinal slot sized to receive a rubber band. After the rubber band is inserted into the slot, a locking pin is inserted into the first end of the rubber-band loop which has been inserted in the slot. The rubber band is then pulled back through the slot, thereby locking the plastic handle, rubber band, and locking pin into a bundle tie assembly. The second end of the rubber band is wrapped around an extension cord, rope, or the like and snapped around the plastic handle of the first end of the rubber band. The bundle tie assembly self-tightens to quickly and neatly secure the extension cord.

3 Claims, 2 Drawing Sheets

BUNDLE TIE

CROSS-REFERENCE TO RELATED APPLICATION

This application is a non-provisional application claiming the benefits of provisional application Ser. No. 06/013,379 filed Apr. 16, 1996.

FIELD OF INVENTION

The present invention relates to an elastic binding device having a locking handle for use to organize coils of ropes, cords, and the like.

BACKGROUND OF THE INVENTION

It is already well known by the description and drawing illustrations of U.S. Pat. No. 4,158,250 issued on Jun. 19, 1979 to Ringwald to provide a binding device of a type in which a closed loop elastic band is disposed in encircling relation about a bundle and one opposite end is projected through the other opposite end and held against withdrawal therefrom by a dowel pin inserted in a directional path (i.e. along the lengthwise axis of the dowel pin) through the projected opposite end, whereby the dowel pin so positioned and used is effective to secure the binding device in place.

In use, however, the dowel pin is often inadvertently pushed or otherwise urged through additional directional movement, with the consequence that it released the projected or engaged end of the elastic and the bundle is no longer held together. The device is too cumbersome and costly to be effective for tying up coils of rope or extension cords.

Another invention addresses the problem of bundling coils of rope. U.S. Pat. No. 4,991,265 (1991) to Campbell et al. discloses a one piece plastic strap having a locking cuff and a series of locking discs. The user must thread the locking discs through the locking cuff and then pull the strap tight. These precise hand maneuvers require coordination and take time.

The present invention is rapidly deployed around a coil of rope. An elastic band self tightens. The device is inexpensive to manufacture. It can be used by ski patrollers, utility linemen, boatsmen, and home users to quickly bundle a coil of rope or cord.

SUMMARY OF THE INVENTION

The main object of the present invention is to provide an elastic band with a handle to enable the quick bundling of a coil or rope or cord.

Another object of the present invention is to design the pieces of the handle to be assembled in a cost effective manner.

Other objects of this invention will appear from the following description and appended claims, reference being made to the accompanying drawings forming a part of this specification wherein like reference characters designate corresponding parts in the several views.

In reality, the present invention is a traditional large rubber band. One end loop of the rubber band is inserted into a slot in a two inch cylindrical handle. Then a locking pin is inserted into the end loop. The rubber band is then pulled back out of the slot, but the locking pin permanently secures the handle to the rubber band. The device can be quickly wrapped around a coil of rope. The handle is inserted into the opposite end loop to secure the device around the coil of rope.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
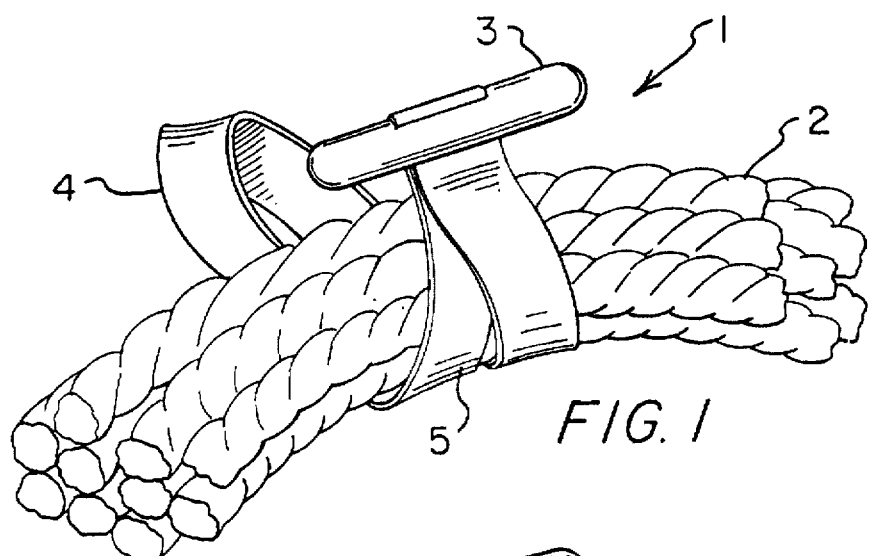
FIG. 1 is a perspective view of a rope coil being secured by the preferred embodiment.

Referring first to FIG. 1 a bundle tie 1 consists of a rubber band 5 having a handle 3 affixed to a first end loop and having an open second end loop 4. The handle 3 is being threaded through the second end loop 4 after the rubber band 5 has been passed around the rope coil 2.

Figure 2:
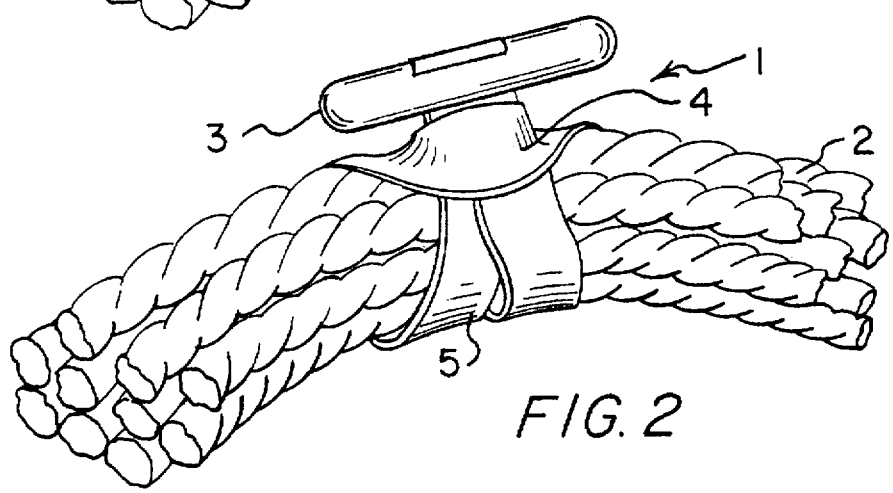
FIG. 2 is the same view as FIG. 1 with the device secured

Referring next to FIG. 2 the rubber band 5 has self-tightened around the rope coil 2. The second end loop 4 is secured against the handle 3.

Figure 3:
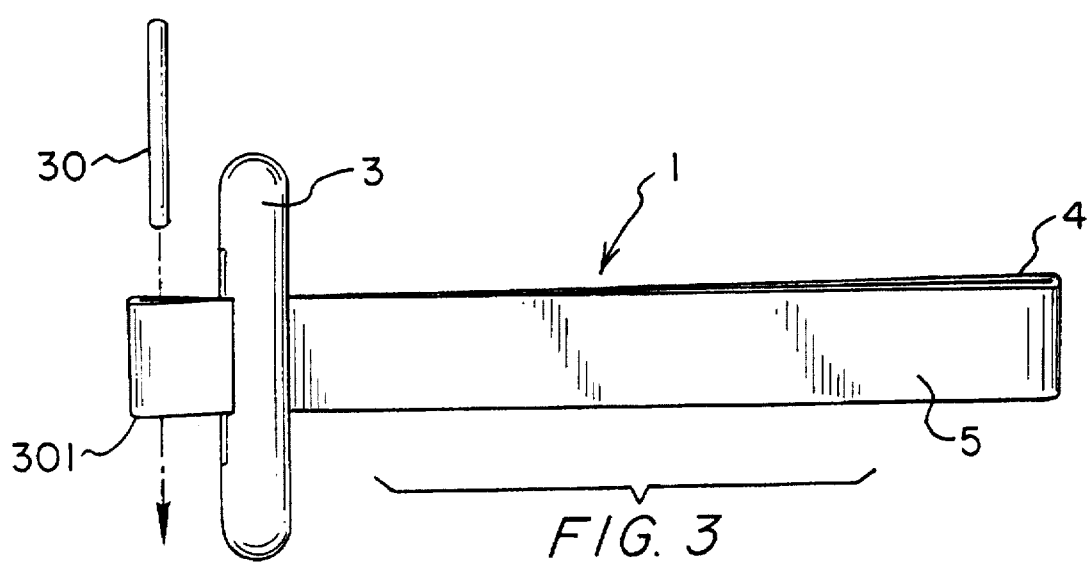
FIG. 3 is an exploded view of the preferred embodiment.
Figure 4:
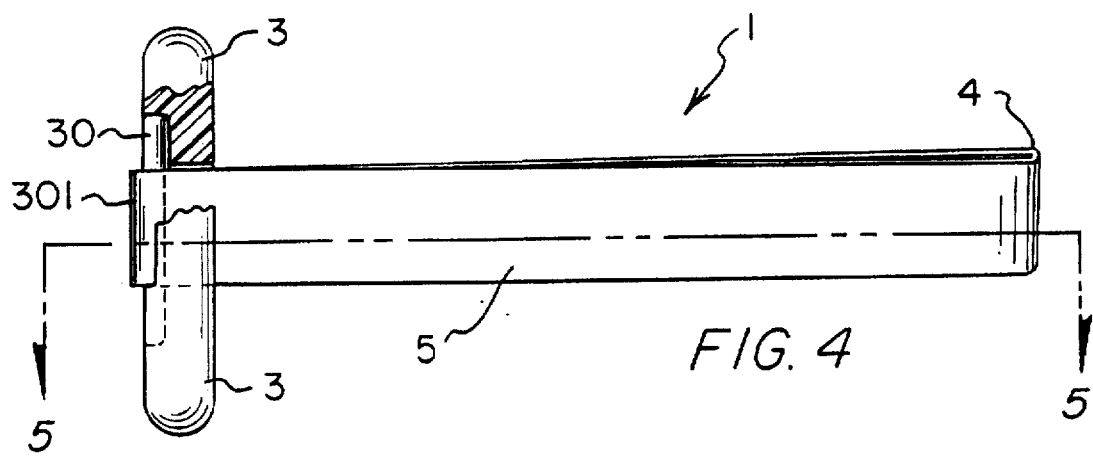
FIG. 4 is a side plan view of the preferred embodiment with a partial cutaway of the handle.
Figure 5:
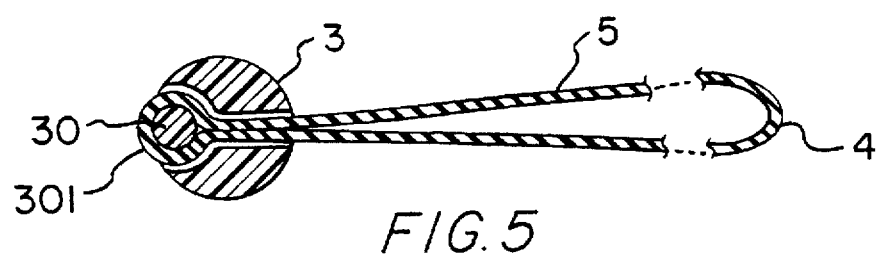
FIG. 5 is a sectional view taken along line 5—5 of FIG. 4.
Figure 6:
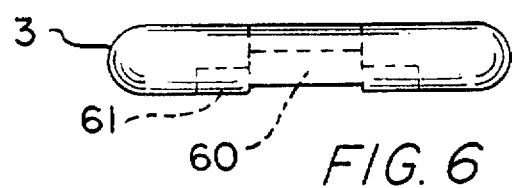
FIG. 6 is a side plan view of the handle.

Referring next to FIGS. 3, 6 the bundle tie 1 is assembled by inserting the first end loop 301 through the slot 60 of handle 1. Then the locking pin 30 is inserted into the first end loop 381. Next, the rubber band 5 is pulled to lock the locking pin 30 in the notch 61 of handle 3. FIGS. 4, 5 show the completed assembly in sectional view.

Figure 7:
FIG. 7 is a side plan view of the locking pin.

FIGS. 6, 7 show the individual handle 3 and pin 30 components. The handle 3 is nominally two inches long. The rubber band 5 is nominally 0.625 inch wide.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A binding device for circumferentially containing a bundle comprising:

a closed-loop elastic band having a first and a second end loop portion and disposed around a bundle in a stretched condition;

a handle having a slot which has a notch at each end of the slot;

a locking pin sized to lock into the notches at each end of the slot;

said first end loop portion having a connection through the slot and locked to the handle by the locking pin, whereby said band remains contracted about and circumferentially contains said bundle by a threaded connection of the handle through said second end loop portion.

2. The binding device of claim 1, wherein the handle is made of plastic and has a length of about two inches.

3. In a binding device of a type in which a closed-loop elongated elastic band having opposed first and second end loops is disposed in encircling relation about a bundle with said first end loop projected through the second end loop and held against withdrawal therefrom by a handle attached to the first end loop, the improvement comprising a slot in the handle receiving the first end loop, said slot having notches to lock a locking pin thereinto, and said first end loop connecting inside the slot and around the locking pin when the locking pin is locked in the notches.

* * * * *